United States Patent Office 2,790,705
Patented Apr. 30, 1957

2,790,705

PROCESS FOR PRODUCING FLUORIDE CONTAINING COMPOUNDS BY REACTION OF BORIC ACID AND ALKALI METAL SILICOFLUORIDE

Robert Hill Kean and Edward Wyllys Taylor, Richmond, and Joseph William Venable, Chesterfield County, Va., assignors to Virginia-Carolina Chemical Corporation, Richmond, Va., a corporation of Virginia No Drawing. Application October 24, 1952,
Serial No. 316,786

7 Claims. (Cl. 23—88)

This invention relates to a process for the recovery of fluorine and fluorides from wastes and obnoxious gases such as those evolved for example in processes for the treatment of phosphate rock such as are employed in the manufacture of superphosphates, phosphoric acid and other products derived from phosphate rock.

As is well known, when phosphate rock, which commonly contains 2.5 to 4.5% of fluorine, is acidified with a strong mineral acid, such as sulfuric or phosphoric acid, gases containing fluorine are evolved. In the customary process of making superphosphate fertilizer, fluorine-containing gases are evolved from the mixer in which the acid and rock, in finely divided form, are mixed and from the so-called den in which the mixture is stored. These gases generally are free or substantially free of phosphate. When phosphoric acid is concentrated by evaporation, the gases evolved from the acid concentrator generally contain not only fluorine but also some phosphorus compounds.

For the purpose of disclosing the present invention, the fluorine in all of the evolved gases may be assumed to be in the form of silicon tetrafluoride and the phosphorus in the form of phosphoric acid ($H_3PO_4$) which is carried in the evolved gases in the form of a mist.

An object of our invention is to recover the fluorine from the phosphorus containing gases and to eliminate the phosphorus and silicon so that the recovered fluorine compounds may be used in the production of valuable products such as metal fluorides, fluoborates and double or mixed salts of alkali metal and aluminum fluorides which are substantially free of silicon and phosphorus.

More specifically an object of our invention is the production of mixed or double salts of sodium and aluminum fluorides, such as cryolite and chiolite, which are useful in the production of aluminum provided they are sufficiently free of silicon and phosphorus which are present in the starting material.

Another object of the invention is to provide a process which is adapted to recover fluorine from all of the gases evolved in the manufacture of triple superphosphate, in which about one third of the fluorine is found in the gases from the mixer and den which are free of phosphorus, and about two thirds of the fluorine is found in the gases from the acid concentrator which are contaminated by phosphorus.

Both silicon and phosphorus compounds are harmful impurities in fluorine compounds, such as the double or mixed fluorides of sodium and aluminum, and since both occur in the starting material, both must be eliminated in the course of the process of converting the fluorine from the starting material to said product.

The invention is based upon reactions involving boric acid or a boric acid compound (by which term is meant a metallic salt of boric acid such as calcium or sodium borate) which is recovered in the form of boric acid and reused in the process in a cyclical manner.

Preparation of fluoborate solutions from the effluent gases from phosphoric acid concentration In accordance with our invention the fluorine-containing gases, in which the fluorine is present principally as silicon tetrafluoride and which for practical purposes may be regarded as containing the fluorine exclusively in the form of silicon tetrafluoride, said gases containing also phosphorus in the form of phosphoric acid mist, are scrubbed with water. This is an old, well known and highly efficient method for the recovery of fluorine from such gases and solutions containing from 2% to 30% or more of $H_2SiF_6$ are obtained. The phosphate content of the solution will vary with the phosphoric acid content of the gases and, of course, with the concentration of the $H_2SiF_6$ solution. For the purpose of our invention, the gases generally are scrubbed with water at a temperature within the range from about 20° to about 60° C. to a hydrofluosilicic acid concentration of 5–30%. The resulting slurry, which consists essentially of water, hydrofluosilicic acid, phosphoric acid and hydrated silica, is filtered to separate the silica. The silica is washed and the washings added to the filtrate. The resulting solution of hydrofluosilicic acid and phosphoric acid is then neutralized, preferably to a pH value of about 4, by the addition of sodium carbonate. Other alkali metal compounds may be employed, such as sodium hydroxide or the corresponding potassium compounds, to produce the corresponding potassium salts, but sodium carbonate generally is preferred due to its relatively low cost and the utility of the resulting salts. The neutralization results in the precipitation of sodium silicofluoride, which is separated by filtration and washed, thereby yielding a product substantially free of phosphate.

The principal reactions involved in the above described steps may be represented by the following equations:

(1) $3SiF_4 + 2H_2O = 2H_2SiF_6 + SiO_2$
(2) $H_2SiF_6 + Na_2CO_3 = Na_2SiF_6 + CO_2 + H_2O$

The equations used above and in the remaining parts of our disclosure are used for illustrative purposes only and we do not intend, therefore, that our invention shall be limited to or circumscribed by the specific details set forth in these equations, except as they are recited in the appended claims.

A typical example of the preparation of phosphate-free sodium silicofluoride from the effluent gases from the phosphoric acid concentrators follows:

EXAMPLE I

The aqueous liquors, resulting from scrubbing the effluent gases, which contain hydrofluosilicic acid, phosphoric acid and silica, were filtered to remove the silica and the precipitate was thoroughly washed with water. The filtrate contained approximately 78.5 grams/l. of phosphoric acid and 58.7 grams/l. of fluorine. 54.6 grams/l. of sodium carbonate was added to the solution with a resultant pH of about 4. The precipitated sodium silicofluoride was removed by filtration and washed with water. A 90% yield was obtained.

The filtrate from this sodium silicofluoride filtration can be continually recycled through the original scrubbing apparatus thereby building up the concentration of phosphoric acid in this solution until the concentration is great enough to warrant return of the solution to the actual evaporator for recovery of the phosphoric acid. This is an added advantage of our invention in that the phosphoric acid which is now being lost in the form of mist in the effluent gases can be recovered, free from contamination with fluorine; the fluorine having been converted to sodium silicofluoride as described.

The sodium silicofluoride produced as described above is now, in accordance with our invention, to be reacted with boric acid in accordance with the skeleton equation (3) $4Na_2SiF_6 + 5H_3BO_3 = 4SiO_2 + 4NaF + 4NaBF_4 + HBF_4 + 7H_2O$ but we have found that this reaction must be carried out in an acid medium in order to prevent the precipitation and loss of sodium fluoride along with the silica. For example if the reaction of the foregoing equation is carried out without the addition of acid other than the boric acid, the silica, which is separated from the reaction products by filtration and washing, has been found to contain as much as 47% of fluorine compounds, whereas if the reaction is carried out in an acid medium the losses of fluorine may be reduced to an insignificant amount. For example, the reaction was carried out with an addition of sufficient sulfuric acid to give a concentration thereof in the reaction mixture of about 8% and the recovery of fluorine then amounted to from about 98% to 100%. The presence of sulfate is, however, objectionable when the fluorine-containing reaction products are to be used in the preparation of sodium aluminum fluoride products, such as cryolite, because the preparation of such fluorides results, as will appear hereinafter, in the regeneration of boric acid, which for economy must be returned to the process and in which the sulfate will build up to an intolerable degree as the recycling of the boric acid is repeated. Removal of sulfate from the regenerated boric acid solution, as by chemical precipitation or fractional crystallization, has been found to be impractical. Consequently, we have determined that the acidity required to prevent loss of fluorine with the silica in the reaction of the foregoing Equation 3 is preferably furnished by some acid other than sulfuric acid and since the ultimate object of the invention is the production of fluorides, we have determined further that the acid should be preferably one which supplies additional fluorine e. g. $H_2SiF_6$ or HF or $HBF_4$. Aside from contamination of the solution with objectionable anion as in the case of the sulfate noted above, any suitable acid capable of providing the necessary acidity is operable.

In the case of $H_2SiF_6$, which is readily available in our process, the reaction may be represented as follows:

(4) $H_2SiF_6 + Na_2SiF_6 + 3H_3BO_3 = HBF_4 + 2NaBF_4 + 2SiO_2 + 5H_2O$

When a substantial excess of boric acid, e. g. 50% excess over that required for the reaction i. e. 4.5 mols of boric acid to one mole of the hydrofluosilicic acid and one mole of the sodium silicofluoride, is used the yield of the desired reaction products is substantially 100%. As indicated an excess of boric acid is to be used in Reaction 4 and the excess generally should amount to at least about 50%, i. e., one should use at least one and one-half times as much boric acid as is theoretically required.

The acidity required to prevent loss of fluorine should be at least about one equivalent of acid to one mole of sodium silicofluoride. This is about the optimum concentration of acid to prevent excessive loss of fluorine in the silica filtration. For example; one equivalent (0.5 mole) of $H_2SiF_6$ per mole of $Na_2SiF_6$ yields a precipitate of silica, after standard washing, containing less than 8% fluorine; 0.38 mole of $H_2SiF_6$/mole $Na_2SiF_6$ gave silica containing 16% fluorine; 0.25 mole, 32% fluorine; and if no $H_2SiF_6$ was present, as much as 47% fluorine was found in the silica precipitate.

We have further found that the composition of the reaction product may be varied by varying the ratio of hydrofluosilicic acid and sodium silicofluoride. For example, with one mole of hydrofluosilicic acid to two moles of sodium silicofluoride and using an excess of boric acid, which is not shown in the following equation, the reaction is as follows:

(5) $H_2SiF_6 + 2Na_2SiF_6 + 4H_3BO_3 = 2NaF + 2NaBF_4 + 2HBF_4 + 3SiO_2 + 6H_2O$

Hydrofluoric acid is not readily available in our process but could, as stated above, be used as the acidifying agent according to the reaction:

(6) $2HF + 2Na_2SiF_6 + 3H_3BO_3 = HBF_4 + 2NaF + 2NaBF_4 + 2SiO_2 + 5H_2O$

Fluoboric acid which is readily available in our process may, as stated above, be used as the acidifying agent for the reaction between the sodium silicofluoride and the boric acid the reaction being as follows:

(7) $4HBF_4 + 4Na_2SiF_6 + 5H_3BO_3 = 4NaF + 4NaBF_4 + 5HBF_4 + 4SiO_2 + 7H_2O$

As will be apparent the foregoing process, while especially designed to recover fluorine from gases containing phosphate and to eliminate the phosphate, may be used to recover the fluorine from the gases which do not contain phosphate. No modification of the above process is necessary excepting that the above described filtration to separate the sodium silicofluoride from the phosphate may be simply omitted and the slurry of sodium silicofluoride treated directly with boric acid.

Reactions 1 and 2 may be, and generally are, carried out at or near room temperature. It is noted in this connection that the hydrofluosilicic acid solution produced by scrubbing the gases with water may be at a somewhat elevated temperature due to the heat absorbed from the gases. This, and even higher temperatures, may be tolerated but lower temperatures are preferred. It is noted, however, that completion of the above described process requires an acid and, as has been pointed out, this acid preferably is a fluorine-containing acid but not necessarily one, and one which, of course, is free of contaminating material, particularly phosphate.

We have found that the acid required for the above described process advantageously may be furnished by the production thereof from the fluorine content of that part of the gases formed in the process of making phosphate fertilizer which do not contain phosphate, i. e. the gases from the mixer and den.

*Preparation of fluoborate solutions from the effluent gases from the mixer and den*

The gases from the mixer and den, as noted above, contain fluorine principally, or in effect, in the form of silicon tetrafluoride. This fluorine may be recovered and converted into an acid, suitable for use in the above described process, by scrubbing with water to produce a solution of hydrofluosilicic acid which may be applied either with or without separation of silica (see Equation 1) as shown in Equations 4 and 5. Or the hydrofluosilicic acid produced by scrubbing with water may be reacted with boric acid as disclosed in an application in the name of Edward Wyllys Taylor and Joseph William Venable Serial No. 282,474 filed April 15, 1952, to produce a solution of fluoboric acid in accordance with the reaction equation:

(8) $2H_2SiF_6 + 3H_3BO_3 = 3HBF_4 + 2SiO_2 + 5H_2O$ and said fluoboric acid may be used in the above described process as indicated in Equation 7.

It is noted that the inventions of said application Serial No. 282,474 and the present application are assigned to the same assignee.

Our preferred procedure, which is based upon our discovery that fluoboric acid may be made directly by scrubbing the fluorine-containing gases with boric acid solution without the intermediate production of hydrofluosilicic acid, is as follows.

The gases containing $SiF_4$, and which are sufficiently free of phosphate, are scrubbed in the customary manner including recycling the scrubbing liquid excepting that water is substituted by boric acid solution. An illustrative example is as follows:

EXAMPLE 2

The entering gas contained 1.49 grams of fluorine per cubic meter and was at a temperature of 68° to 70° C. The gases left the scrubber at a temperature of 60° to 66° C. The gas velocity at the inlet to the scrubber was 12.2 to 14.6 meters per second. The boric acid scrubbing solution contained 8.2 grams per 100 grams of water and entered the tower at 38° to 50° C. and left the tower at 58° to 65° C. The rate of flow of scrubber liquid was 3.2 to 3.9 liters per minute. After 30 minutes the concentration of fluorine in the scrubbing liquid was 2.04% and after 85 minutes it was 5.1%. The rate of fluorine absorption at 30 minutes was 70 grams of fluorine per minute and at 85 minutes it was 62.7 grams per minute.

By comparison with a similar scrubbing operation carried out with water alone it was found that the absorption of fluorine in boric acid solution was more rapid than in water even though the temperature of the boric acid solution was about 15° C. higher than the temperature of the water. This was surprising because prior experience in the scrubbing of fluorine-containing gases indicated that the absorption would be slower at higher temperature.

In the foregoing example the various factors involved may of course be varied i. e. the concentration and temperature of the boric acid solution, the temperature of the gases, the rate of flow of the gases and the rate of flow of the scrubbing solution. Generally it is preferred to use relatively concentrated boric acid solutions at elevated temperatures which increase the solubility of the boric acid. It is preferred, for instance, to use as the scrubbing liquid a boric acid solution of a concentration approximately equivalent to saturation at 50° C. and to employ this scrubbing liquid at temperatures between 50° and 100° C.

The reaction between the boric acid, silicon tetrafluoride and water might of course be explained on the basis of the process disclosed in said application Serial No. 282,474 i. e.

(9)     $3SiF_4 + 2H_2O = 2H_2SiF_6 + SiO_2$ and

(10)    $2H_2SiF_6 + 3H_3BO_3 = 3HBF_4 + 2SiO_2 + 5H_2O$

There is, however, no evidence that the reaction proceeds in two steps according to the foregoing Equations 9 and 10. It appears rather that the silicon tetrafluoride and boric acid react directly and the reaction may be represented as follows:

(11)
$3SiF_4 + XH_2O + (3+X)H_3BO_3 = $
$\qquad 3HBF_4 + 3SiO_2 + (3+X)H_2O + XH_3BO_3$ In any event the direct process represented by Equation 11 avoids the evolution of fluorine which occurs when solutions of hydrofluosilicic acid are heated to temperatures approaching the boiling point. In the process represented by Equation 11 the scrubbing solution, which contains an excess of boric acid, may be maintained at a temperature of 90–100° C. without significant loss of fluorine. For example a solution containing 5.1% of fluorine and 6.1% of boric acid was held at 95°–100° C. for one hour without a detectable loss of fluorine.

The scrubbing process described above yields a slurry of silica in a water solution of fluoboric acid containing the excess of boric acid. In accordance with the present invention this slurry is mixed with the sodium fluosilicate filter cake, produced as described above in connection with Equation 2, and the reaction proceeds in accordance with Equation 7.

It has been pointed out above that phosphate must be eliminated so that it will not be present in the final reaction product of Equation 7 which is to be used for the production of fluoride salts such as artificial cryolite. Phosphate must be absent also in the scrubbing solution used in the process of Equation 11 because if the reaction between boric acid and silicon tetrafluoride is carried out in the presence of phosphate (e. g. derived from the fluorine-containing gases) it appears that a reaction occurs and that the final fluoborate solution is contaminated with phosphate.

If phosphate is present in the fluoborate solution used for the production of the sodium aluminum fluoride product the phosphate contaminates this product. This has been proved by a series of experiments in which it appeared that 0.01% of phosphoric acid in the fluoborate solution results in 0.19% of phosphate in the sodium aluminum fluoride product and that when the phosphate content of the fluoborate solution amounted to 2.5%, the contamination of the product amounted to 20.6%. Attempts have been made to remove phosphate from the fluoborate solution prior to its use for the precipitation of sodium aluminum fluoride but were unsuccessful. It is important, therefore, that the fluorine-containing gases used in the production of the fluoborate solution shall be substantially free of phosphate and that the sodium silicofluoride product of Equation 2 shall be substantially free of phosphate.

In carrying out the process of Equation 7 using the sodium silicofluoride filter cake produced in accordance with Equation 2 and the fluoborate-silica-boric acid slurry produced in accordance with Equation 11, the filter cake and slurry are mixed and heated and maintained at 90°–100° C. for about 45–60 minutes. The reaction proceeds in accordance with Equation 7. The precipitated silica is separated by filtration and washed with water and the combined filtrate and washings is available for use for the production of the desired fluoride salts.

*Preparation of alkali metal aluminum fluorides*

In the use of the fluoborate solution prepared in accordance with Equation 7 for the preparation of useful salts such as cryolite, chiolite etc., the solution is mixed with aluminum hydroxide and sodium carbonate is then added to complete the reaction which is illustrated by the following equation:

(12)
$6HBF_4 + 8NaF + 6NaBF_4 + 12Al(OH)_3 + 3Na_2CO_3 = $
$\qquad 4Na_5Al_3F_{14} + 12H_3BO_3 + 3CO_2 + 3H_2O$ The fluoborate solution is of a complex and variable composition and probably does not contain $HBF_4$, $NaF$ and $NaBF_4$ in the proportions shown in the foregoing Equation 12. This Equation 12 is only a typical representation and does not necessarily define our process or the exact constitution of the fluoborate solution produced. It is given for illustrative purposes only. The composition may even differ as to the ingredients, but the results obtained correspond with those indicated by the equation. In determining how much aluminum hydroxide to use for reaction with a given quantity of fluoborate solution, two facts are required, i. e. the ratio of $NaF$ to $AlF_3$ in the desired product and the quantity of fluorine in the solution. If the desired ratio of $NaF$ to $AlF_3$ is as in cryolite, i. e. 3 to 1 or in chiolite i. e. 5 to 3, sufficient aluminum hydroxide is added to combine with half of the fluorine content of the solution for the production of cryolite or with nine-fourteenths of the fluorine in the case of chiolite and then sufficient sodium carbonate is added to neutralize the reaction mixture and make up the necessary ratio of sodium to aluminum, i. e. 3 to 1 in the case of cryolite and 5 to 3 in the case of chiolite. Then, regardless of the composition of the fluoborate solution, assuming of course that it contains only fluorides ($HF$ or $NaF$) and fluoborates ($HBF_4$ and/or NaBF₄), the results will be as indicated in Equation 12, i. e. the products will be a sodium aluminum fluoride and boric acid.

The process of Equation 12 is illustrated by the following example.

EXAMPLE 3

To a fluoborate solution prepared in accordance with Equation 7 and recently filtered at about 95° C., aluminum hydroxide is added in the molecular ratio of 0.214 mole of aluminum to each mole of fluorine. A precipitate forms since there are some sodium ions present. The resulting slurry is heated at 90–100° C. for about 30 minutes and then sodium carbonate is added until a pH of 5 is reached. This pH value is an accurate indication of the completion of the reaction. The resulting precipitated sodium aluminum fluoride is separated by filtration and washed to free it of boric acid. The filtrate and washings, which consists essentially of a solution of boric acid, is recycled for use in scrubbing the fluorine-containing phosphate-free gases.

The results of typical runs are shown in the following table:

| Run | Gms. Total F | Gms. Al(OH)₃ | Gms. Product | Percent Yield |
| --- | --- | --- | --- | --- |
| 1 | 19.0 | 16.7 | 31.5 | 96.6 |
| 2 | 19.0 | 16.7 | 32.0 | 98.2 |
| 3 | 19.0 | 16.7 | 32.7 | 99.8 |
| 4 | 19.0 | 16.7 | 32.7 | 99.8 |
| 5 | 190.0 | 167.0 | 319.0 | 97.8 |
| 6 | 190.0 | 167.0 | 322.0 | 98.9 |
| 7 | 190.0 | 167.0 | 315.0 | 96.6 |

A typical analysis of the sodium aluminum fluoride produced is as follows:

| | Percent |
| --- | --- |
| Al | 17.91 |
| F | 53.80 |
| Na | 22.37 |
| SiO₂ | 1.30 |

The product is essentially free of phosphorus or phosphate and is suitable for use in the commercial production of aluminum from its ores. The product is useful also, if desired, for the production of other fluorides or fluoride complexes or solutions of salts useful for the preparation of pharmaceuticals, insecticides, solvents, refrigerants, organic intermediates etc.

In the above described preferred practice of our invention we have disclosed a process for the utilization of the combined total effluent gases from the various operations involved in phosphate rock treatment and the conversion of the waste fluorine, contained in these effluent gases, into useful products. It is obvious to one skilled in the art that the processes of our invention are applicable to the recovery of fluorine values from any one of these operations singly and the subsequent conversion of these values into useful fluorides, for example, sodium aluminum fluoride. The following example illustrates this preparation from the scrubbing liquor from only the mixer and dens.

EXAMPLE 4

The scrubbing process described above in Example 2 yielded a slurry of silica in a water solution of fluoboric acid containing excess boric acid. The slurry was heated to 95° C. for 15 minutes and the silica was removed by filtration. The resulting filtrate contained 5.18% fluorine, which was equivalent to 5.97% fluoboric acid. 291.7 gms. of the filtrate (containing 17.4 gms. of HBF₄) was heated to 95° C. and 13.3 gms. of aluminum hydroxide was added with stirring. The aluminum hydroxide was allowed to dissolve and 15.0 gms. of sodium carbonate was added. Sodium aluminum fluoride precipitated. The mixture was filtered and a 95% yield of product was obtained after washing and drying.

Similar fluoborate solutions can also be treated with calcium carbonate to precipitate calcium fluoride.

EXAMPLE 5

A solution of 17.4 gms. of fluoboric acid in 275 mls. of water was heated to 90–95° C. and 39.6 gms. of calcium carbonate was added with stirring and the reaction mixture was maintained at this temperature for thirty minutes. The mixture was filtered and a theoretical yield of calcium fluoride was obtained.

It is also obvious to those skilled in the art that our above described process can be used to prepare fluoborate solutions, and subsequently fluorides and sodium aluminum fluoride, from solid sodium silicofluoride obtained from sources other than those actually described above in our process. Sodium silicofluoride is available on the commercial market and the following illustrates the preparation of sodium aluminum fluoride from this commercial product.

EXAMPLE 6

A mixture of 14.4 gms. of hydrofluosilicic acid in 275 mls. of water, 18.8 gms. of sodium silicofluoride and 27.7 gms. of boric acid (50% excess) was heated at 90–95° C. for 45 minutes. The mixture was filtered and, after washing and drying, a 100% yield of silica was obtained. The filtrate was reheated to 95° C., and 20.0 gms. of aluminum hydroxide was added with stirring. The aluminum hydroxide dissolved but, because of the presence of sodium ions which instantly formed a small quantity of sodium aluminum fluoride, the solution never became entirely clear. After 30 minutes at this temperature, 12.1 gms. of sodium carbonate was added with stirring. The mixture was filtered and after washing and drying a 95% yield of sodium aluminum fluoride was obtained.

The fluoborate solutions prepared in our processes can also be used for the preparation of fluorides; for example, to a solution of fluoboric acid-sodium fluoborate (8.78 gms. of HBF₄ and 21.9 gms. of NaBF₄) was added 53 gms. of sodium carbonate. A better than 90% yield of sodium fluoride was obtained.

In the foregoing description we have described such details of procedure as are necessary to enable one skilled in the art to which this invention relates to practice the invention. We have not given the details of well known procedures such as the acidification and subsequent treatment of phosphate rock to produce superphosphates and phosphoric acid, the scrubbing of the fluorine-containing gases with water or the manner in which solutions to be reacted are mixed and precipitates are filtered and washed when only conventional procedures well known to those skilled in the art are involved. Since only conventional apparatus is required for carrying out the process none has been illustrated.

We claim:

1. Process for the preparation of alkali metal aluminum fluorides which comprises continuously scrubbing a gas containing silicon tetrafluoride and phosphoric acid with a water solution of phosphoric acid thereby producing a slurry containing said phosphoric acid and hydrofluosilicic acid in solution and silica in solid form, filtering said slurry to separate said silica from a filtrate containing said phosphoric acid and hydrofluosilicic acid, at least partially neutralizing said filtrate by the addition thereto of an alkaline alkali metal compound thereby forming a slurry containing alkali metal silicofluoride in solid form and phosphoric acid in solution, filtering the last named slurry to separate said alkali metal silicofluoride from a filtrate containing said phosphoric acid, returning the last-named filtrate to said scrubbing step, continuously scrubbing a second gas containing silicon tetrafluoride which is free of phosphoric acid with an aqueous solution of boric acid to form a slurry containing silica, fluoboric acid, boric acid and water, mixing the last-named slurry with the above-named separated alkali metal silicofluoride thereby producing a slurry containing silica in solid form and alkali metal fluoride, alkali metal fluoborate and fluoboric acid in solution, filtering the last-named slurry to separate silica from a filtrate, mixing the last-named filtrate with aluminum hydroxide and an alkaline alkali metal compound thereby producing a slurry containing an alkali metal aluminum fluoride in solid form and boric acid in solution, filtering said last-named slurry to separate said alkali metal aluminum fluoride from a filtrate and returning the last-named filtrate to the second-named scrubbing step.

2. Process which comprises scrubbing a gas containing silicon tetrafluoride which is free of phosphoric acid with an aqueous solution of boric acid thereby producing a slurry containing silica in solid form and hydrofluoboric acid in solution, mixing said slurry with an alkali metal silicofluoride thereby producing a slurry containing silica in solid form and alkali metal fluoride and a fluoboric compound of the group consisting of fluoboric acid and alkali metal fluoborate in solution, filtering the last-named slurry to separate said silica from a filtrate containing said alkali metal fluoride and said fluoboric compound, reacting said filtrate with aluminum hydroxide and an alkaline alkali metal compound to produce a slurry containing alkali metal aluminum fluoride in solid form and boric acid in solution, filtering the last named slurry and returning the filtrate to the scrubbing step in a repetition of the process.

3. Process which comprises forming a mixture initially consisting essentially of water, an alkali metal silicofluoride, boric acid and an acid of the group consisting of HF, $H_2SiF_6$ and $HBF_4$, the ratio of said acid of said group to alkali metal silicofluoride initially present in said mixture being at least 1 mole of HF or $HBF_4$ per mole of alkali metal silicofluoride or at least one-half mole of $H_2SiF_6$ per mole of alkali metal silicofluoride and the quantity of boric acid initially present being at least 50% in excess of the quantity theoretically required for reaction with said alkali metal silicofluoride and said acid of said group and filtering the resulting mixture to separate silica from a filtrate containing alkali metal fluoborate and fluoboric acid.

4. Process as defined in claim 3 in which said acid of said group is HF.

5. Process as defined in claim 3 in which said acid of said group is $H_2SiF_6$.

6. Process as defined in claim 3 in which said acid of said group is $HBF_4$.

7. Process which comprises forming a mixture initially consisting essentially of water, an alkali metal silicofluoride, boric acid and an acid of the group consisting of HF, $H_2SiF_6$ and $HBF_4$, the ratio of said acid of said group to alkali metal silicofluoride initially present in said mixture being at least 1 mole of HF or $HBF_4$ per mole of alkali metal silicofluoride or at least one-half mole of $H_2SiF_6$ per mole of alkali metal silicofluoride and the quantity of boric acid initially present being at least 50% in excess of the quantity theoretically required for reaction with said alkali metal silicofluoride and said acid of said group, filtering the resulting mixture to separate silica from a filtrate containing alkali metal fluoborate and fluoboric acid, mixing said filtrate with aluminum hydroxide and an alkaline alkali metal compound thereby producing a slurry containing an alkali metal aluminum fluoride in solid form and a solution containing boric acid, filtering the last named slurry to separate said alkali metal aluminum fluoride from said solution containing boric acid, and mixing the last named solution with alkali metal silicofluoride and an acid of said group in a repetition of the procedure.

References Cited in the file of this patent

UNITED STATES PATENTS

| | | |
|---|---|---|
| 1,247,165 | Stahl | Nov. 20, 1917 |
| 2,182,509 | Heiser | Dec. 5, 1939 |
| 2,556,064 | Caldwell et al. | June 5, 1951 |
| 2,602,726 | Winter | July 8, 1952 |
| 2,692,186 | Kamlet | Oct. 19, 1954 |

FOREIGN PATENTS

| | | |
|---|---|---|
| 15,394 | Great Britain | 1890 |

OTHER REFERENCES

J. W. Mellor: "Inorganic and Theoretical Chem.," vol. 5, 1924 ed., page 62. Longmans, Green and Co., N. Y.

J. W. Mellor, "Modern Inorg. Chem.," page 657, new impression of the eighth ed., January 1935.

"Fluorine Control and Recovery," by D. D. Morris, B. P. Sutherland, and C. H. Wright, pp. 271–274 in the Canadian Chem. and Metallurgy, August 1937.

Stolba: Ziet. Anal. Chem. Article at 3, 312 (1864).